Jan. 26, 1954
R. G. HOLLIFIELD
2,667,365
SWIVEL CONNECTION FOR VEHICLE UNITS
Filed Jan. 21, 1950
5 Sheets-Sheet 1
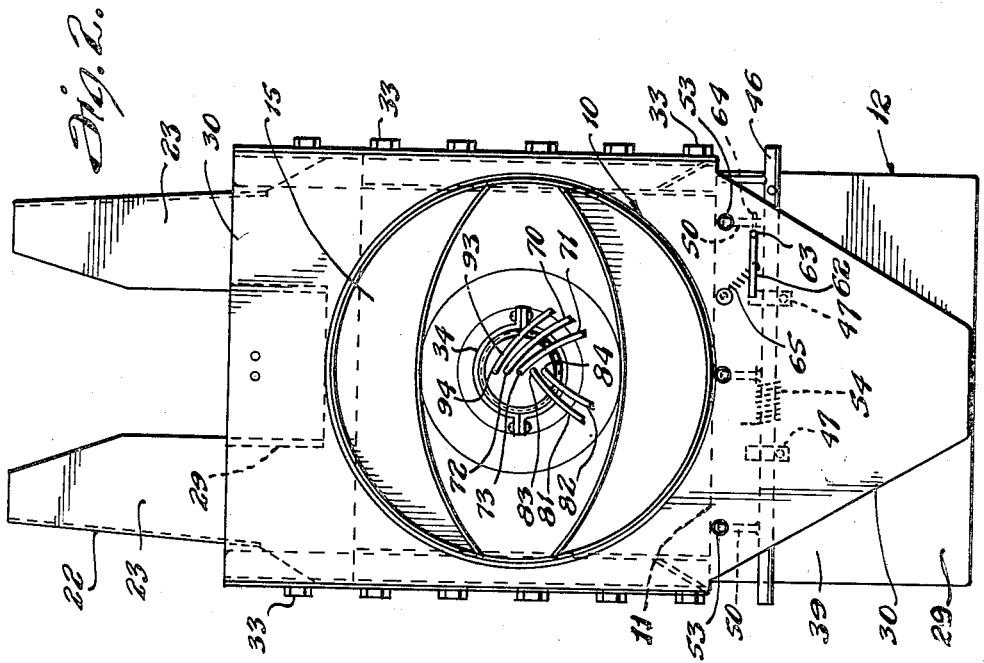
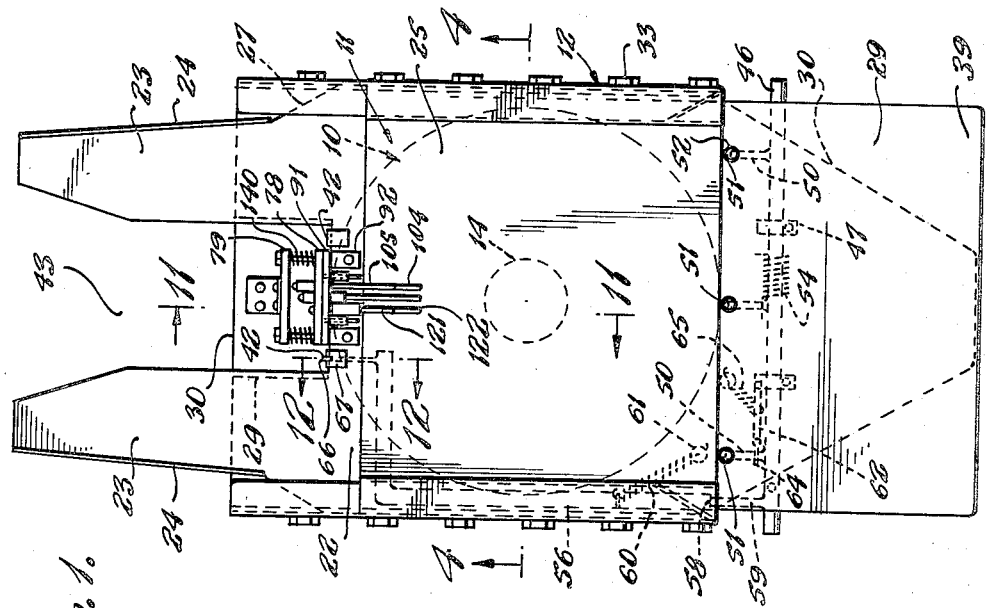
INVENTOR.
Roy G. Hollifield
BY
Clark & Ott
ATTORNEYS Jan. 26, 1954
R. G. HOLLIFIELD
2,667,365
SWIVEL CONNECTION FOR VEHICLE UNITS
Filed Jan. 21, 1950
5 Sheets-Sheet 2
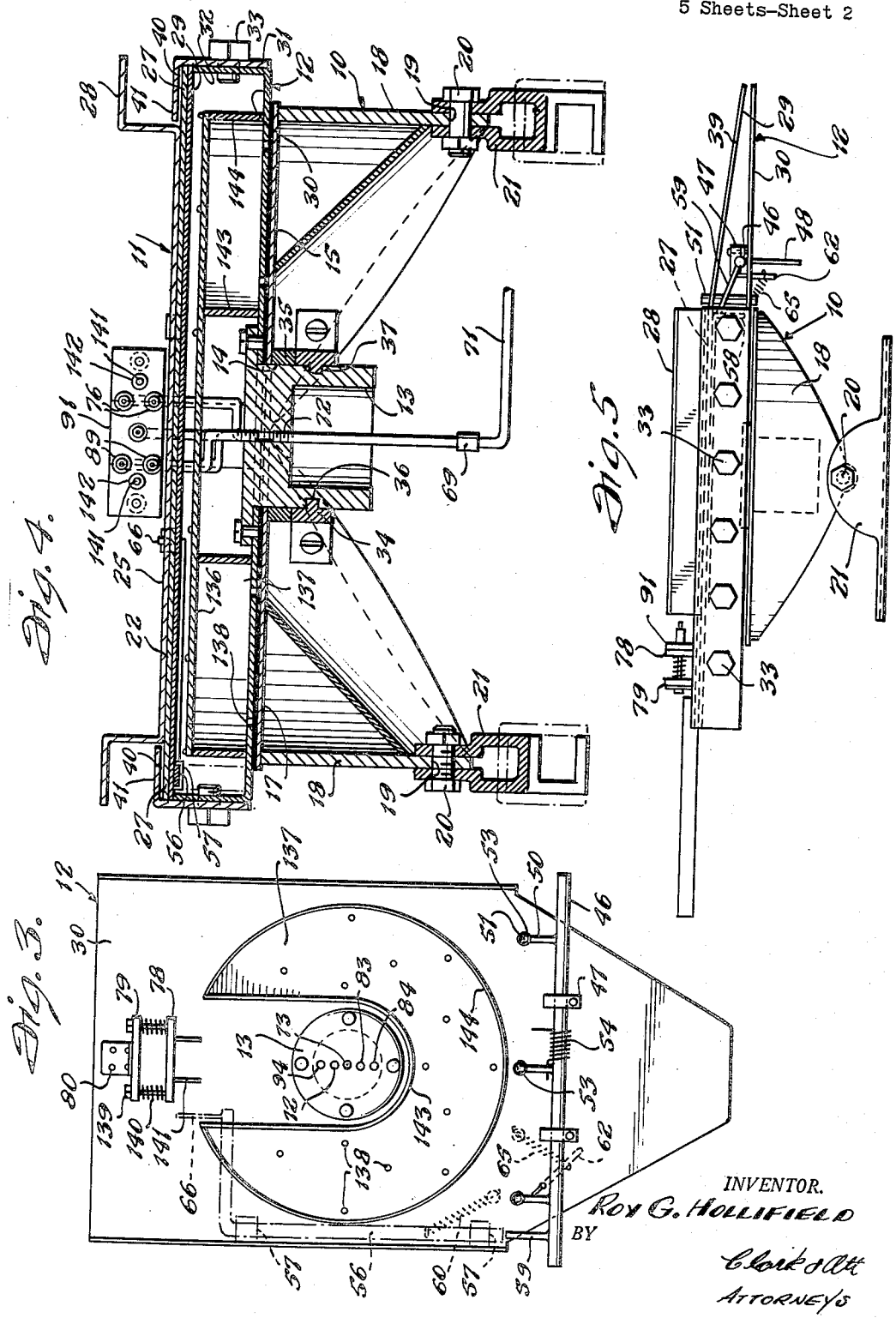
INVENTOR.
Roy G. Hollifield
BY
Clark & Att
ATTORNEYS

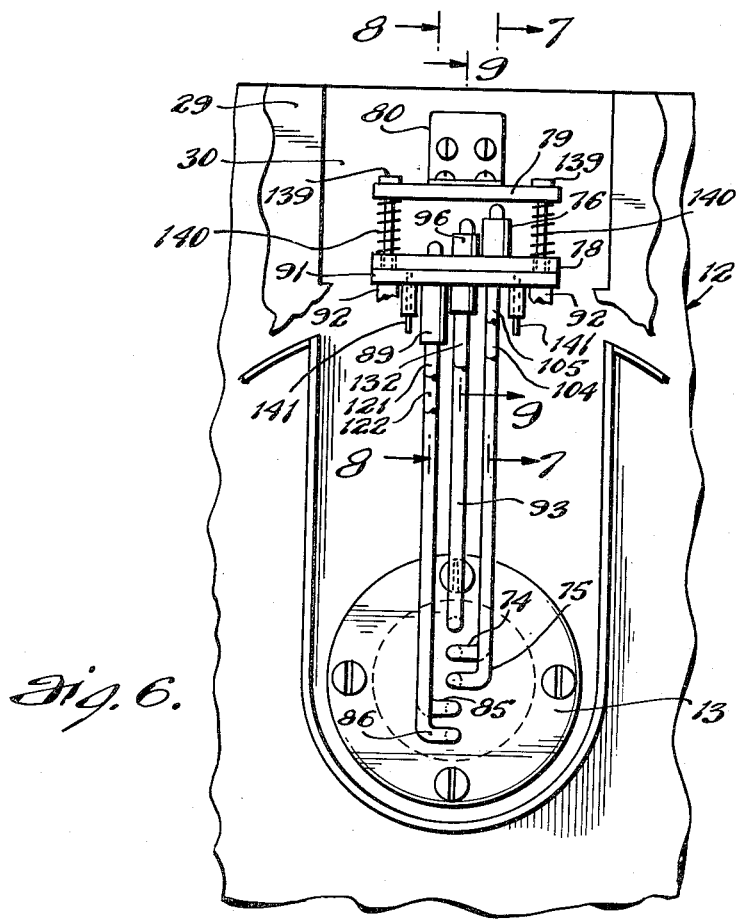

Jan. 26, 1954
R. G. HOLLIFIELD
2,667,365
SWIVEL CONNECTION FOR VEHICLE UNITS
Filed Jan. 21, 1950
5 Sheets-Sheet 4
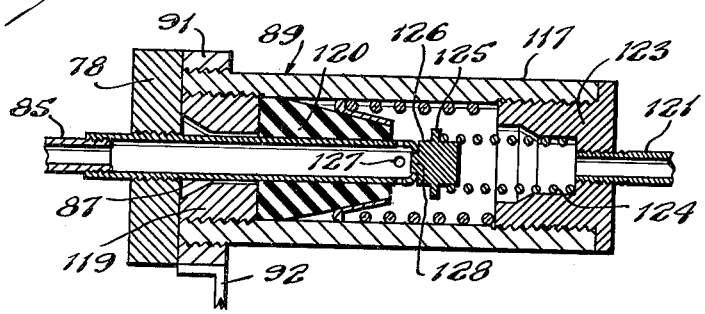
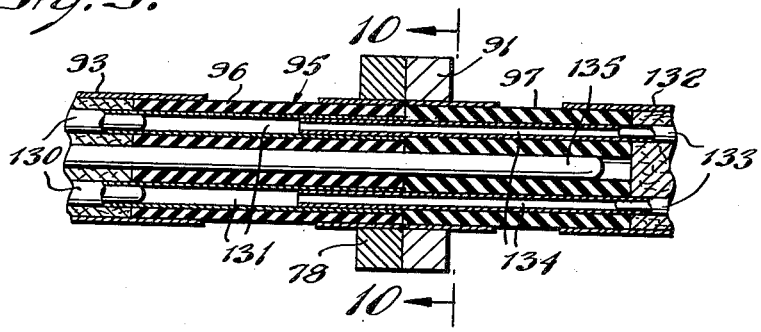
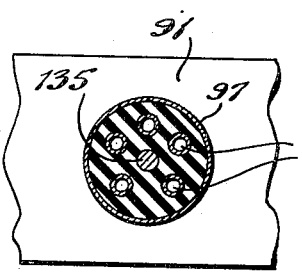
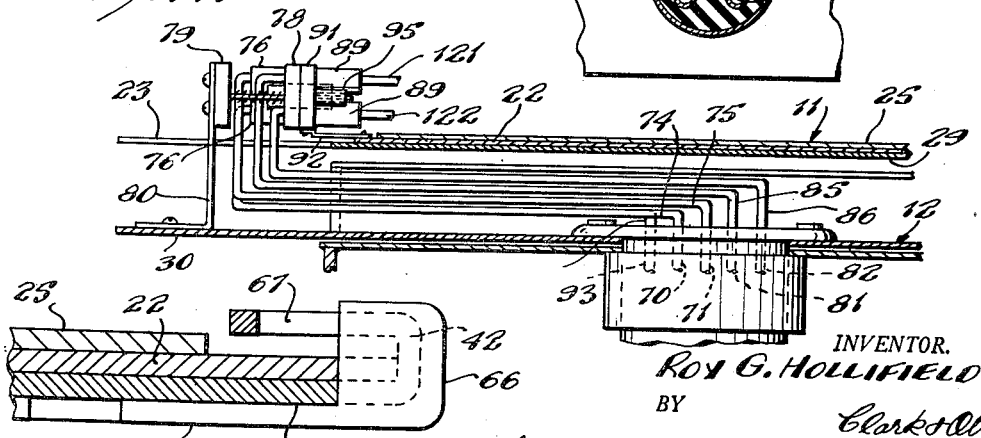
INVENTOR.
ROY G. HOLLIFIELD
BY
Clark & Ott
ATTORNEYS

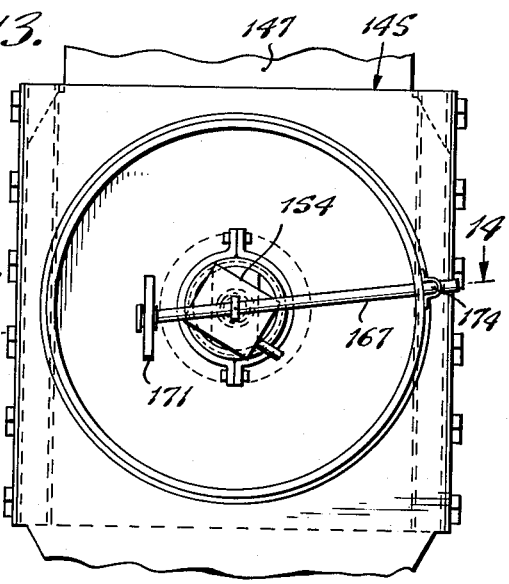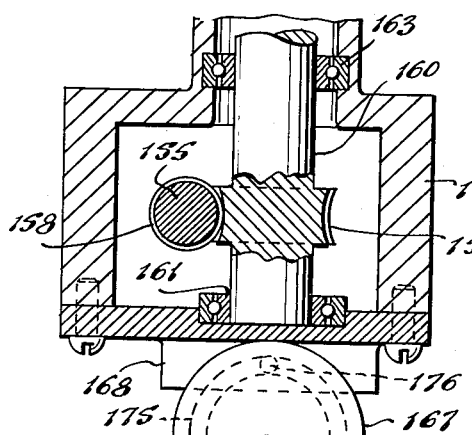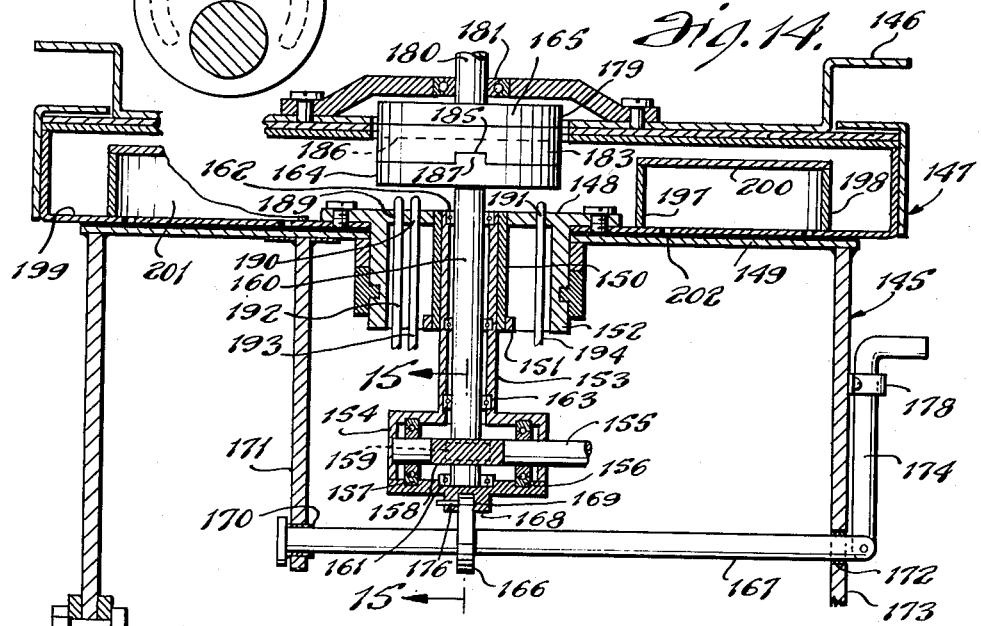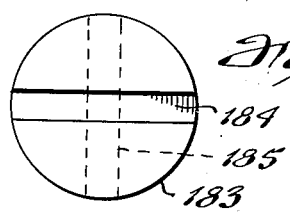

Patented Jan. 26, 1954

2,667,365

UNITED STATES PATENT OFFICE 2,667,365

SWIVEL CONNECTION FOR VEHICLE UNITS

Roy G. Hollifield, Brooklyn, N. Y.

Application January 21, 1950, Serial No. 139,799

1 Claim. (Cl. 280—434)

This invention relates to swivel connections for coupling vehicle units together and the invention has particular reference to a swivel connection of said character which is constructed and arranged for coupling the service lines of the units together.

An object of the invention is to provide a swivel connection for vehicle units consisting of parts adapted to slidably engage for swivelly connecting the units together and which parts have interfitting service line connections adapted to automatically engage to connect the service lines of the vehicle units together when the vehicle units are moved into swivel engagement.

Another object of the invention is to provide a swivel connection for coupling vehicle units such as a tractor and semi-trailer together to permit of articulation of the tractor with reference to the semi-trailer and by which service lines such as air, oil and electric cables leading from instrumentalities on the tractor with corresponding lines connected with instrumentalities on the semi-trailer are automatically connected with the tractor and semi-trailer are connected.

Still another object of the invention is to provide means for locking the parts of the swivel connection in coupled relation.

With the foregoing and other objects in view, reference is now made to the following specification and accompanying drawings in which the preferred embodiments of the invention are illustrated.

In the drawings:

Fig. 1 is a top plan view of a swivel connection for vehicle units constructed in accordance with the invention.

Fig. 2 is an under side view thereof.

Fig. 3 is a top plan view of the intermediate section of the connection.

Fig. 4 is a vertical sectional view taken approximately on line 4—4 of Fig. 1.

Fig. 5 is a view in side elevation of the swivel connection.

Fig. 6 is a fragmentary enlarged top plan view of the intermediate section showing the means for connecting the service lines.

Fig. 7 is an enlarged longitudinal sectional view taken approximately on line 7—7 of Fig. 6 through one of the check valves of the air service lines which connects the service lines of the tractor and trailer together.

Fig. 8 is a similar view taken approximately on line 8—8 of Fig. 6 through one of the check valves of the oil service lines which connects the service lines of the tractor and trailer together.

Fig. 9 is an enlarged longitudinal view taken approximately on line 9—9 of Fig. 6 showing the sliding connector of the electrical service line which connects the electrical cables of the tractor and trailer together.

Fig. 10 is a cross-sectional view taken approximately on line 10—10 of Fig. 9.

Fig. 11 is an enlarged fragmentary sectional view taken approximately on line 11—11 of Fig. 1.

Fig. 12 is a similar view taken approximately on line 12—12 of Fig. 1.

Fig. 13 is a fragmentary bottom plan view of a modified form of swivel connection for vehicle units constructed in accordance with the invention.

Fig. 14 is an enlarged vertical sectional view taken approximately on line 14—14 of Fig. 13.

Fig. 15 is en enlarged fragmentary sectional view taken approximately on line 15—15 of Fig. 14.

Fig. 16 is a top plan view of the intermediate section of the clutch member shown in elevation in Fig. 14.

Referring to the drawings by characters of reference and more particularly to the form of the invention illustrated in Figs. 1 to 12 thereof inclusive, the swivel connection is illustrated in its application to a construction for swivelly coupling vehicle units together such as a tractor and a semi-trailer in which the rear wheels of the tractor are disposed under and support the forward portion of the semi-trailer.

The swivel connection consists of a fifth wheel construction which includes a base 10, an upper section 11 and an intermediate section 12. The base 10 is rockably mounted on the frame of the tractor and forms a support on the tractor for the forward end of the trailer. The upper section 11 is rigidly affixed to the trailer and slidably engages the intermediate section 12 for connecting the tractor and trailer together while the intermediate section has bearing engagement with the base 10 and has a king-pin 13 affixed thereto which extends through an axial opening 14 in the top wall 15 of the base so as to swivelly connect the tractor and trailer together.

The top wall 15 of the base is of circular formation in plan and has a plane upper face which forms a bearing surface for the intermediate section 12. Depending from the top wall are arcuate side walls 18 having horizontal apertures 19 through which extend bolts 20 which rockably connect the base upon the side frames 21 of the tractor.

The upper section 11 consists of an elongated plate 22 having forwardly directed tongues 23 which taper inwardly toward their forward ends and are provided with upstanding flanges 24 extending along their outer side edges. The plate 22 is secured to the under side of a flanged plate 25 affixed to the frame of the trailer adjacent the forward end thereof to dispose the tongues 23 in forwardly projecting relation and with the opposite side edge portions 27 of the plate 22 projecting outwardly beyond the flanges 28 of the upper plate 25.

The intermediate section 12 includes upper and lower plates 29 and 30 having flanges 31 and 32 respectively which interfit and are secured together by longitudinally spaced bolts 33 to dispose the plates in superposed spaced apart relation. The lower plate 30 has the king-pin 13 affixed thereto which extends through the axial opening 14 in the top wall 15 of the base 10 and is secured in position therein by a two-part clamping ring 34 disposed in surrounding relation with the king-pin below an annular spacer member 35. The ring member 34 is formed with an annular rib 36 which snugly fits an annular recess 37 in the pin for securing the pin in position in the bearing opening and connecting the intermediate section 12 and base 10 for relative swivel turning movement about the king-pin as a vertical axis.

The upper plate 29 is formed with a rear portion 39 which extends downwardly and rearwardly in angular relation and forwardly of said rear portion the said plate is provided with grooves 40 along the opposite longitudinal side edges thereof which are formed by the inwardly directed wall portions 41 disposed in overlying spaced relation with the upper face thereof. The said grooves are adapted to slidably receive the opposite edge portions 27 of the upper section 11 for releasably connecting the intermediate and upper sections together and which also releasably connects the tractor and trailer together.

In connecting the tractor and trailer together the tractor is backed under the forward portion of the trailer into engagement with the tongues 23 of the upper section 11 which slide over the inclined portion 39 of the upper plate 29 of the intermediate section 12 and over the upper plate 29 into projecting relation therewith to dispose the side edge portions 27 of said section in the grooves 40. Stop lugs 42 are provided on the forward end of the upper plate 29 of the intermediate section which engage over the forward edge of the plate 22 of the top section at the rear of the recess 43 between the tongues 23 for limiting the forward movement of the upper section 11 with reference to the intermediate section 12.

In order to automatically lock the tractor and trailer together when the upper section 11 engages the stop lugs 42 of the intermediate section 12, a rock shaft 46 is provided which is mounted for rocking movement in bearings 47 affixed to the upper face of the lower plate 30 and with the rock shaft extending laterally between the upper and lower plates 29 and 30 of the intermediate section 12. The rock shaft 46 is provided with a downwardly directed handle 48 and a plurality of forwardly extending lever arms 50 which engage in openings in vertically disposed locking studs 51 slidably arranged in aligned openings 52 and 53 in the upper and lower plates 29 and 30 respectively. The rock shaft is tensioned by a coiled spring 54 for normally rocking the shaft to dispose the studs 51 in upwardly projected relation with the upper ends thereof protruding through the upper place 29 at the rear of the upper section 11 and adapted to engage thereagainst for preventing disengagement of the upper and intermediate sections 11 and 12.

When the tractor and trailer are to be coupled together the rock shaft is maintained with the locking studs disposed in lowered position by means of a slide bar 56 mounted in guides 57 attached to the under side of the upper plate 29. The slide bar is provided with a depending rear terminal 58 adapted to impinge against a lever arm 59 projecting forwardly from the rock shaft 46 for holding the rock shaft against upward turning movement. A spring 60 is affixed to the slide bar 56 and to a lug 61 carried by the upper plate 29 for tensioning said slide bar into engagement with the lever arm 59.

A hand lever 62 is pivoted in an opening 63 in the lower plate 30 and is provided with a head 64 at the upper end thereof. The hand lever is tensioned by a spring 65 for normally disposing the head 64 in underlying relation with one of the lever arms 50 for maintaining the said arm in forwardly inclined relation and the locking studs 51 in upwardly projected position at the rear of the upper section 11. By manually swinging the hand lever 62 rearwardly against the tension of the spring 65, the head 64 thereof is swung forwardly from beneath the lever arm 50 so that the handle 48 may then be manually swung rearwardly so as to rotate the rock shaft 46 and lower the lever arm 59 whereby the slide bar 56 will be moved by its spring to dispose the terminal end thereof in overlying relation with the lever arm 59 to maintain the locking studs 51 in lowered position. The slide bar 56 is formed with an upwardly projecting forward end 66 which protrudes through a slot 67 in one of the stop lugs 42. The forward end 66 is engaged by the forward edge of the upper section 11 when said section engages the intermediate section 12 so as to connect the tractor and trailer together to thereby move the slide bar forwardly to release the rock shaft. This permits the spring 60 to rotate the rock shaft so as to move the locking studs 51 into upwardly projected relation at the rear of the upper section 11.

In tractor-trailer vehicles service lines such as air, oil and electric are required for the operation of the brakes, pump and lights on the trailer. The air lines on the tractor include flexible conduits 70 and 71 which are connected by swing joints 69 with piping secured in openings 72 and 73 extending upwardly through the king-pin 13. Above the king-pin flexible conduits 74 and 75 are secured in the upper ends of said openings respectively and connect with check valves 76 carried by and projecting forwardly through a cross-head 78 resiliently connected with a cross-head 79 supported by a bracket 80 secured in upstanding relation on the forward end of the lower plate 30 of the intermediate section 12.

The oil line on the tractor includes flexible conduits 81 and 82 which are connected by swing joints 88 with piping secured in the lower ends of openings 83 and 84 extending upwardly through the king-pin 13. Above the king-pin flexible conduits 85 and 86 are secured in said openings respectively and connect with stiff metallic tubes 87 rigidly carried by and projecting rearwardly through said cross-head 78. The inner ends of the tubes 87 slidably engage in check valves 89 carried by a cross-head 91 affixed to a bracket 92 mounted on the upper face of the elongated plate 22 of the upper section 11.

The electrical line includes an electric cable 93 which extends through an opening 94 in the king-pin with the upper end of the cable connected with one end of a sliding connector 95. One section 96 of said connector is secured in an opening in the cross-head 78 and projects forwardly therefrom and the other section 97 thereof is secured in and projects rearwardly of the cross-head 91.

The check valve 76 for each of the air service lines is illustrated in detail in Fig. 7 of the drawings while the check valve 89 for each of the oil service lines is illustrated in Fig. 8 of the drawings. The check valves 76 each include a cylindrical casing 99 threadedly secured in the cross-head 78 and having apertured nuts 100 and 101 threadedly secured in the opposite ends thereof. The flexible conduits 74 and 75 of the air service lines are secured in the apertured nuts 100 of the check valves 76 respectively and freely engaging through the nuts 101 of the check valves respectively are stiff tubes 102 which are rigidly carried by the cross-heads 91 with the protruding ends of the tubes respectively connected with conduits 104 and 105 of the air service lines on the trailer.

A conical shaped resilient rubber sleeve 106 is arranged within each of the check valves 76 against the inner face of the nut 101 in surrounding relation with the inner end of the stiff tube 102 which snugly and slidably fits the same. A metallic cap 107 is fitted over the reduced end of the resilient sleeve 106 and is provided with a flange 108 extending peripherally about the enlarged end thereof to form a seat for a coil spring 109 interposed between said flange and the inner face of the nut 100. The spring 109 together with the fluid pressure within the valve function to resiliently retain the resilient sleeve 106 against the inner face of the nut 101.

In order to close off the flow of air from each of the check valves 76, a valve element 110 is provided which includes a reduced inner end 111 disposed in axial alignment with the stiff tubes 102 of the valves respectively and which is normally tensioned thereagainst by a coil spring 112 interposed between the recessed inner end of the nut 109 and an annular flange 113 extending peripherally about the valve element intermediate the ends thereof. The stiff tube 102 of each of the valves is formed with a plurality of apertures 114 through which the air flows when the valve is maintained in open relation by the shoulder formed by the reduced end 111 engaging against the end of the stiff tube with the reduced inner end 111 protruding into the open end thereof as illustrated in Fig. 7 of the drawings which is the position of the valve element when the tractor-trailer are in coupled relation. However, when the stiff tubes 102 are withdrawn from the resilient sleeves 106 of the check valves respectively by disconnecting the tractor and trailer, the springs 112 function to force the annular portion 115 of the valve element 10 snugly into the inner end of the resilient sleeve 106 to thereby close off the flow of air from the tractor.

The check valves 89 for each of the oil service lines are similar in construction to the check valves 76 but in connection with the oil service lines, the cylindrical casing 117 of each of the check valves 89 is threadedly secured in the cross-head 91 of the trailer with the valve reversely arranged. The flexible conduits 85 and 86 of the oil service lines are connected with the stiff tubes 87 of the check valves 89 respectively, with each of the tubes freely engaging through a nut 119 and with the inner ends of the tubes snugly and slidably fitting a conical shaped resilient rubber sleeve 120 similar to the sleeve 106 in the previously described check valve. The conduits 121 and 122 of the oil service lines on the trailer are each connected with a nut 123 of the check valves 89 respectively and a coil spring 124 is interposed between the recessed inner end of the nut 123 and a flange 125 of a valve element 126 so as to tension the same against the end of the stiff tubes 87 of the check valves respectively when the tractor and trailer are in coupled relation as indicated in Fig. 8 of the drawings. This disposes the valve element 126 in open relation so that the oil flows through the apertures 127 in the stiff tubes 87 when the tractor and trailer are in coupled relation and when the same are uncoupled the stiff tubes 87 are withdrawn whereby the springs 124 move the valve element 126 to dispose the cylindrical portion 128 in closing relation within the resilient sleeve 120 so as to close off the flow of the oil through the check valves.

The electrical cable 93 is composed of a plurality of conductor wires 130, five being shown in the embodiment illustrated in Fig. 10 of the drawings. The conductor wires 130 are each electrically connected with one end of a stiff tube 131 extending longitudinally of the connector section 96 while the electrical cable 132 on the tractor similarly includes a corresponding number of conductor wires 133 each of which is electrically connected with the outer end of a stiff tube 134 extending longitudinally of the connector section 97. The tubes 134 protrdude beyond the inner end of the connector section 97 and are adapted to snugly fit within the stiff tubes 131 for coupling the connector sections 96 and 97 together and electrically connecting the conductor wires 130 on the tractor with the conductor wires 133 on the trailer.

The cross-head 79 is connected with the cross-head 78 in parallel spaced relation by means of bolts 139 which slidably engage through openings in the cross-head 79 are are provided with coiled expansion springs 140 disposed in surrounding relation therewith and interposed between the cross-heads 78 and 79 so as to maintain the cross-head 78 in resiliently spaced relation from the cross-head 79. The cross-head 78 is provided with rearwardly projecting tapered pins 141 which are disposed in alignment with flared openings 142 in the cross-head 91 when the tractor and trailer are being coupled together. The pins 141 engage said openings in order to align the cross-heads 78 and 91 so that the stiff tubes 87 and 102 engage in the check valves 76 and 89 respectively, and the connector sections 96 and 97 engage for electrically connecting the sections together.

The intermediate section 12 is formed with inner and outer peripheral walls 143 and 144 secured to the upper face of the bottom wall 30 and with a cover 136 secured in closing relation on the upper edges thereof so as to provide a compartment 137 adapted to receive oil-soaked packing for lubricating the upper surface of the base 10 by seepage of the oil through the openings 138 in the bottom wall 30.

In the form of the invention illustrated in Figs. 13 to 15 inclusive, a swivel connection is shown which is similarly constructed for swively connecting vehicle units together such as a tractor and semi-trailer as in the previous form of the invention. The swivel connection similarly consists of a fifth wheel construction which includes a base 145, an upper section 146 and an intermediate section 147 which are similar in construction to the base 10, upper section 11 and intermediate section 12 of the previous form of the invention, but in this form however, the said sections are provided with means for mechanically transmitting power from the power take-off of the transmission of the tractor in addition to service lines such as air and electric for the operation of the brakes and lights on the trailer.

The base 145 is mounted for rocking movement on the frame of the tractor and forms a support on the tractor for the forward end of the trailer, similar to the base 10 in the previous form of the invention, while the upper section 146 is rigidly affixed to the trailer and slidably engages the intermediate section 147 for connecting the tractor and trailer together. The intermediate section has bearing engagement with the base 145 and has a king-pin 148 affixed thereto which extends through an axial opening in the top wall 149 of the base for swively connecting the tractor and trailer together similar to the construction in the previous form of the invention. In this form however, the king-pin 148 is centrally apertured for receiving a sleeve 150 which is welded to and depends from the upper end thereof and engages at its lower end in a centrally apertured cross member 151 which is secured at its ends to the lower end of the peripheral rim 152 of the king-pin.

Mounted within the sleeve 150 is a cylindrical tube 153 which is connected at its lower end to a housing 154 within which is mounted a shaft 155 journaled for rotation in bearings 156 and 157 with the shaft protruding from the housing and operatively connected at its outer end with the power take-off of the transmission of the tractor. The shaft 155 is provided with a worm portion 158 intermediate the bearings 156 and 157 which worm portion is engaged by a worm gear 159 affixed to the lower end of a vertical shaft 160. The said shaft 160 is journaled for rotation in a bearing 161 in the lower portion of the housing 154 and in bearings 162 and 163 in the upper and lower ends of the cylindrical tube 153 with the shaft protruding upwardly through the king-pin 148 and welded or otherwise affixed at its upper end to the lower section 164 of a clutch member 165. The cylindrical tube 153 and housing 154 together with the shafts 155 and 160 have vertical reciprocatory movement as a unit with the tube 153 slidably guided in the sleeve 150.

In order to effect movement in opposite directions of said unit, an eccentric 166 is mounted on a cross-shaft 167 with the eccentric disposed in engagement with a slotted extension 168 formed on the underside of the housing 154. The shaft 167 is mounted for turning movement in a bushing 170 carried by a bracket 171 affixed to and depending from the underside of the base 10. The opposite end of the shaft protrudes through a bushing 172 mounted in the side wall 173 of the base and is provided with a handle 174 for manually turning the shaft to rotate the eccentric for raising or lowering the said unit. The said eccentric is formed with an annular groove 175 in a side face thereof which is engaged by a pin 176 carried by said extension 168 and extending into the groove 175 within the slot 169 for moving the said unit downwardly when the cross-shaft 167 is rotated so as to dispose the enlarged offset portion of the eccentric downwardly below the shaft. The said unit is adapted to be locked in upward position by means of a clip 178 releasably engaging the handle 174 to prevent rotation of the cross-shaft 167.

The clutch member 165 also includes an upper section 179 which is affixed to a vertical shaft 180 mounted for rotation in a bearing 181 carried by a bracket 182 affixed to the upper section 11 of the fifth wheel construction with the shaft 180 projecting upwardly therethrough for operatively connecting the same with an instrumentality carried by the trailer such as a pump or winch for turning the same. Located between the upper and lower sections 179 and 164 of the clutch member 165 is an intermediate clutch section 183 which is formed with a diametrically extending groove 184 in the upper face thereof and with a diametrically extending groove 185 in the lower face thereof which is arranged at right angles with reference to the groove 184. The upper section 179 of said clutch member is formed with a depending rib 186 adapted to snugly fit in the groove 184 in the upper face of the intermediate section 183, while the lower section 164 is formed with an upwardly extending rib 187 adapted to snugly fit in the groove 185 in the lower face of the intermediate clutch section 183. The shafts 160 and 180 are thereby connected together through the clutch member 165 whereby the shaft 180 will be rotated by the turning of the shaft 155 when the unit is disposed in its uppermost position. When the cross-shaft 167 is rotated to lower the said unit, the intermediate clutch section 183 will be disconnected from the upper section 179 so as to disconnect the shafts 160 and 180.

The king-pin 148 is provided with two openings 189 and 190 located at one side of the sleeve 150 and a single opening 191 on the opposite side thereof. Pipe lines 192 and 193 extend through the openings 189 and 191 for connection with the air lines on the tractor, similar to the air pipe lines in the previous form of the invention. While extending through the opening 190 in the king-pin is an electric cable 194 similar to the electric cable 93 in the previous form of the invention. The pipe lines 192 and 193 connect with check valves (not shown) similar to the check valves 76 in the previous form of the invention for supplying air to the trailer, while the electric cable 194 is connected to a sliding connector similar to the sliding connector 95 in the previous form of the invention for providing electric power lines for the trailer.

In this form of the invention the intermediate section 147 is formed with inner and outer peripheral walls 197 and 198 secured to the upper face of the bottom wall 199 and with a cover 200 secured in closing relation on the upper edges thereof so as to provide a compartment 201 adapted for receiving oil-soaked packing for lubricating the upper surface of the base 145 by seepage of the oil through the openings 202 in the bottom wall 199.

What is claimed is:

In a swivel connection for a tractor-trailer combination, an apertured base affixed to the tractor, an upper section affixed to the trailer; an intermediate section having bearing engagement with the base and having a king-pin depending therefrom and mounted in the aperture in the base for swivel turning movement of the base with reference to the intermediate section, said intermediate and upper sections having sliding interfitting engagement for coupling the tractor and trailer together, a rock shaft carried by said intermediate section and having locking studs, means tensioning said rock shaft for rocking the same to move the locking studs into engagement with said upper section for locking the tractor and trailer in coupled relation, a slide bar carried by said intermediate section and operatively engaging said rock shaft to maintain the locking studs in retracted relation out of engagement with said upper section, and said slide bar having a forward end adapted to be engaged by the upper section when the tractor and trailer are coupled together for moving the slide bar to release the rock shaft to permit of movement by said tensioning means to thereby move the locking studs into engagement with the upper section.

ROY G. HOLLIFIELD.

References Cited in the file of this patent

UNITED STATES PATENTS

| Number | Name | Date |
|---|---|---|
| 1,261,261 | Menhall et al. | Apr. 2, 1918 |
| 1,973,610 | Connors | Sept. 11, 1934 |
| 2,062,806 | Casler | Dec. 1, 1936 |
| 2,092,113 | Fuhrman | Sept. 7, 1937 |
| 2,092,115 | Gurton et al. | Sept. 7, 1937 |
| 2,119,460 | Gurton et al. | May 31, 1938 |
| 2,178,841 | Lubbers | Nov. 7, 1939 |
| 2,480,413 | Kirksey | Aug. 30, 1949 |
| 2,485,878 | Hanlon | Oct. 25, 1949 |